(12) United States Patent
Rana et al.

(10) Patent No.: US 11,243,607 B2
(45) Date of Patent: *Feb. 8, 2022

(54) METHOD AND SYSTEM FOR GLINT/REFLECTION IDENTIFICATION

(71) Applicant: Tobii AB, Danderyd (SE)

(72) Inventors: Pravin Kumar Rana, Danderyd (SE); Yimu Wang, Danderyd (SE)

(73) Assignee: Tobii AB, Danderyd (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/420,818

(22) Filed: May 23, 2019

(65) Prior Publication Data

US 2019/0369720 A1 Dec. 5, 2019

Related U.S. Application Data

(63) Continuation of application No. 15/994,704, filed on May 31, 2018, now Pat. No. 10,324,529.

(51) Int. Cl.
| | | |
|---|---|---|
| *G06F 3/01* | (2006.01) | |
| *G02B 27/00* | (2006.01) | |
| *G06K 9/00* | (2006.01) | |
| *G02B 27/01* | (2006.01) | |
| *G06K 9/46* | (2006.01) | |

(52) U.S. Cl.
CPC ......... *G06F 3/013* (2013.01); *G02B 27/0093* (2013.01); *G02B 27/0101* (2013.01); *G02B 27/017* (2013.01); *G02B 27/0172* (2013.01); *G06K 9/0061* (2013.01); *G06K 9/4642* (2013.01); *G02B 2027/014* (2013.01); *G02B 2027/0118* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS 5,231,674 A * 7/1993 Cleveland .............. A61B 3/113
351/210
5,576,780 A * 11/1996 Yancey .................. A61B 3/103
351/209

(Continued)

OTHER PUBLICATIONS

Written Opinion of International Search Authority regarding PCT/US2018/064377, dated Feb. 28, 2019.

(Continued)

*Primary Examiner* — Reza Aghevli
(74) *Attorney, Agent, or Firm* — Samuel I. Yamron

(57) ABSTRACT

A method of identifying scleral reflections in an eye tracking system is disclosed. A glint is identified in an image from an image sensor, wherein the glint is a representation in the image of a reflection of light from a cornea of the eye of the user or from a sclera of the eye of the user. A first pixel intensity of the glint is determined, a second pixel intensity of neighbor pixels of the glint is determined, and an absolute value of the difference between the first pixel intensity of the glint and the second pixel intensity of the neighbor pixels of the glint is determined. The glint is identified as a representation of a reflection from the sclera of the eye of the user on condition that the determined absolute value of the difference is below a predetermine threshold value.

8 Claims, 5 Drawing Sheets

(56) References Cited

U.S. PATENT DOCUMENTS

| | | | |
|---|---|---|---|
| 6,152,563 A * | 11/2000 | Hutchinson | A61B 3/113 351/209 |
| 7,401,920 B1 * | 7/2008 | Kranz | A61B 3/113 351/209 |
| 7,527,008 B2 | 5/2009 | Elvesjo et al. | |
| 7,986,816 B1 * | 7/2011 | Hoanca | G06K 9/00597 382/115 |
| 8,824,779 B1 * | 9/2014 | Smyth | G06T 7/593 382/154 |
| 9,041,787 B2 | 5/2015 | Andersson et al. | |
| 9,329,683 B2 * | 5/2016 | Ebisawa | G06T 7/73 |
| 10,324,529 B1 * | 6/2019 | Rana | G02B 27/0093 |
| 2003/0169213 A1 * | 9/2003 | Spero | G02B 27/0093 345/7 |
| 2006/0238707 A1 * | 10/2006 | Elvesjo | A61B 3/113 351/209 |
| 2007/0040908 A1 | 2/2007 | Cleveland et al. | |
| 2012/0243783 A1 * | 9/2012 | Zimmer | G06T 7/0002 382/167 |
| 2013/0002846 A1 * | 1/2013 | De Bruijn | G06F 3/147 348/78 |
| 2016/0042221 A1 | 2/2016 | Mei et al. | |
| 2016/0103484 A1 | 4/2016 | Guo et al. | |
| 2017/0115483 A1 * | 4/2017 | Aleem | G02B 27/0093 |
| 2017/0196451 A1 * | 7/2017 | Tian | G06K 9/0061 |
| 2017/0243061 A1 * | 8/2017 | Nakashima | G06T 7/269 |
| 2017/0263017 A1 * | 9/2017 | Wang | A61B 3/113 |

OTHER PUBLICATIONS

International Preliminary Report on Patentability regarding PCT/EP2018/064377, dated Dec. 1, 2020.

Gwon et al., "Gaze Tracking System for User Wearing Glasses", Sensors, vol. 14, No. 2, Jan. 27, 2014, pp. 2110-2134.

* cited by examiner

METHOD AND SYSTEM FOR GLINT/REFLECTION IDENTIFICATION

TECHNICAL FIELD

The present disclosure generally relates to the field of eye tracking. In particular, the present disclosure relates to systems and methods for use in identifying reflections from optical arrangements in an eye tracking system.

BACKGROUND

In eye tracking applications, digital images are retrieved of the eyes of a user and the digital images are analyzed in order to estimate the gaze direction of the user. There are different methods for achieving such an estimation. In some methods ambient light is used when retrieving images of the eyes of the user and in some methods additional light sources (illuminators) are used to illuminate the eyes for retrieving images of the eyes of the user. Generally, the estimation of the gaze is based on identification of the pupils of the eyes of the user, together with identification of glints (corneal reflections) in the eyes of the user.

One known method of eye tracking includes the use of infrared light and an image sensor. The infrared light is directed towards the pupil of a user and the reflection of the light is captured by an image sensor. Through analysis of the reflection point, the direction of the user's gaze may be calculated. One such system is described in U.S. Pat. No. 7,572,008 (which is hereby incorporated by reference in its entirety).

Portable or wearable eye tracking devices have also been previously described. One such eye tracking system is described in U.S. Pat. No. 9,041,787 (which is hereby incorporated by reference in its entirety). A wearable eye tracking device is described using illuminators and image sensors for determining gaze direction.

For some cases problems can arise. For example, one or more reflections from other parts of the user's eye than the cornea may result in a situation where the pupil cannot be accurately identified. In such situations it will be difficult or impossible to determine eye direction and/or gaze direction and or eye direction or at least not with desirable reliability.

It would be desirable to provide an eye tracking technology to account for such situations and where reflections from other parts of the user's eye than the cornea reduce the accuracy of eye tracking or makes it difficult or impossible to determine eye direction and/or gaze direction for eye tracking.

SUMMARY

An object of the present disclosure is to address the issues with known systems and methods.

According to a first aspect, there is provided a method of identifying scleral reflections in an eye tracking system. An image of an eye of a user from an image sensor is received. The image is a result of the image sensor detecting light from one or more illuminators reflected from the eye of the user. A glint is identified in the image, wherein the glint is a representation in the image of a reflection of light from a cornea of the eye of the user or from a sclera of the eye of the user. A first pixel intensity of the glint is determined and a second pixel intensity of neighbor pixels of the glint. An absolute value of the difference between the first pixel intensity of the glint and the second pixel intensity of the neighbor pixels of the glint is determined. On condition that the determined absolute value of the difference is below a predetermine threshold value, identifying the glint as a representation of a reflection from the sclera of the eye of the user.

As indicated in the background, some factors that may potentially cause difficulty of determination of gaze direction remain in known method and systems based on identification of the pupils of the eyes of the user together with identification of glints. In some situations, reflections from sclera will be represented as glints in images captured for use in the eye tracking systems. These glints are generally not useful for eye tracking and rather risk to be mistaken for glints resulting from corneal reflections and hence risk to introduce errors. For example, in a situation where representations of reflections from sclera appear in the image in addition the representation of corneal reflections, such reflections risk to introduce errors in an eye tracking algorithm such that it will be difficult or impossible to determine eye direction and/or gaze direction or at least not with desirable accuracy. Identifying a glint that is a representation of a reflection from sclera reduces the risk of introduction of errors in the eye tracking system by mistakenly identifying such glints as representations of corneal reflections.

In general, the pixel intensity of a representation in an image of the sclera is higher than the pixel intensity of a representation in the image of the iris and a representation in the image the pupil, respectively. Hence, the difference between the pixel intensity of a glint in the image and the pixel intensity of neighboring pixel to the glint will be less for a glint in a representation of the sclera than for a glint in a representation of the iris or in a representation of the pupil, respectively. Hence, a threshold can be set such that all, or an acceptable portion of, the glints from the sclera are identified, while limiting the risk that glints resulting from a reflection from the approximately spherical portion of the cornea are identified as glints resulting from a scleral reflection.

In some embodiments the glint is identified as a corneal reflection on condition that the determined absolute value of the difference is above the predetermine threshold value.

According to a second aspect, an eye tracking system is provided comprising a receiver for receiving an image of an eye of a user from an image sensor. The image is a result of the image sensor detecting light from one or more illuminators reflected from the eye of the user. The eye tracking system further comprises processing circuitry configured for identifying a glint in the image. The glint is a representation in the image of a reflection of light from a cornea of the eye of the user or from a sclera of the eye of the user. The processing circuitry is further configured for determining a first pixel intensity of the glint, determining a second pixel intensity of neighbor pixels of the glint, and determining an absolute value of the difference between the first pixel intensity of the glint and the second pixel intensity of the neighbor pixels of the glint. The processing circuitry is further configured to identifying the glint as a representation of a reflection from the sclera of the eye of the user, on condition that the determined absolute value of the difference is below a predetermine threshold value.

In embodiments of the eye tracking system of the second aspect the processing circuit is configured to identifying the glint as a corneal reflection on condition that the determined absolute value of the difference is above the predetermine threshold value.

According to a third aspect, an eye tracking system comprising circuitry configured to perform any one of the method of the first aspect and the embodiments of the first aspect.

Embodiments of the eye tracking system according to the third aspect may for example include features corresponding to the features of any of the embodiments of the method according to the first aspect.

According to a fourth aspect, there is provided one or more computer-readable storage media storing computer-executable instructions that, when executed by an eye tracking system, cause the eye tracking system to perform a method according to the first aspect.

Embodiments of the one or more computer-readable storage media according to the fourth aspect may for example include features corresponding to the features of any of the embodiments of the method according to the first aspect.

The one or more computer-readable media may for example be one or more non-transitory computer-readable media.

It is noted that embodiments of the invention relate to all possible combinations of features recited in the claims.

BRIEF DESCRIPTION OF THE DRAWINGS

Exemplifying embodiments will be described below with reference to the accompanying drawings.

All the figures are schematic and generally only show parts which are necessary in order to elucidate the respective embodiments, whereas other parts may be omitted or merely suggested.

DETAILED DESCRIPTION

Figure 1:
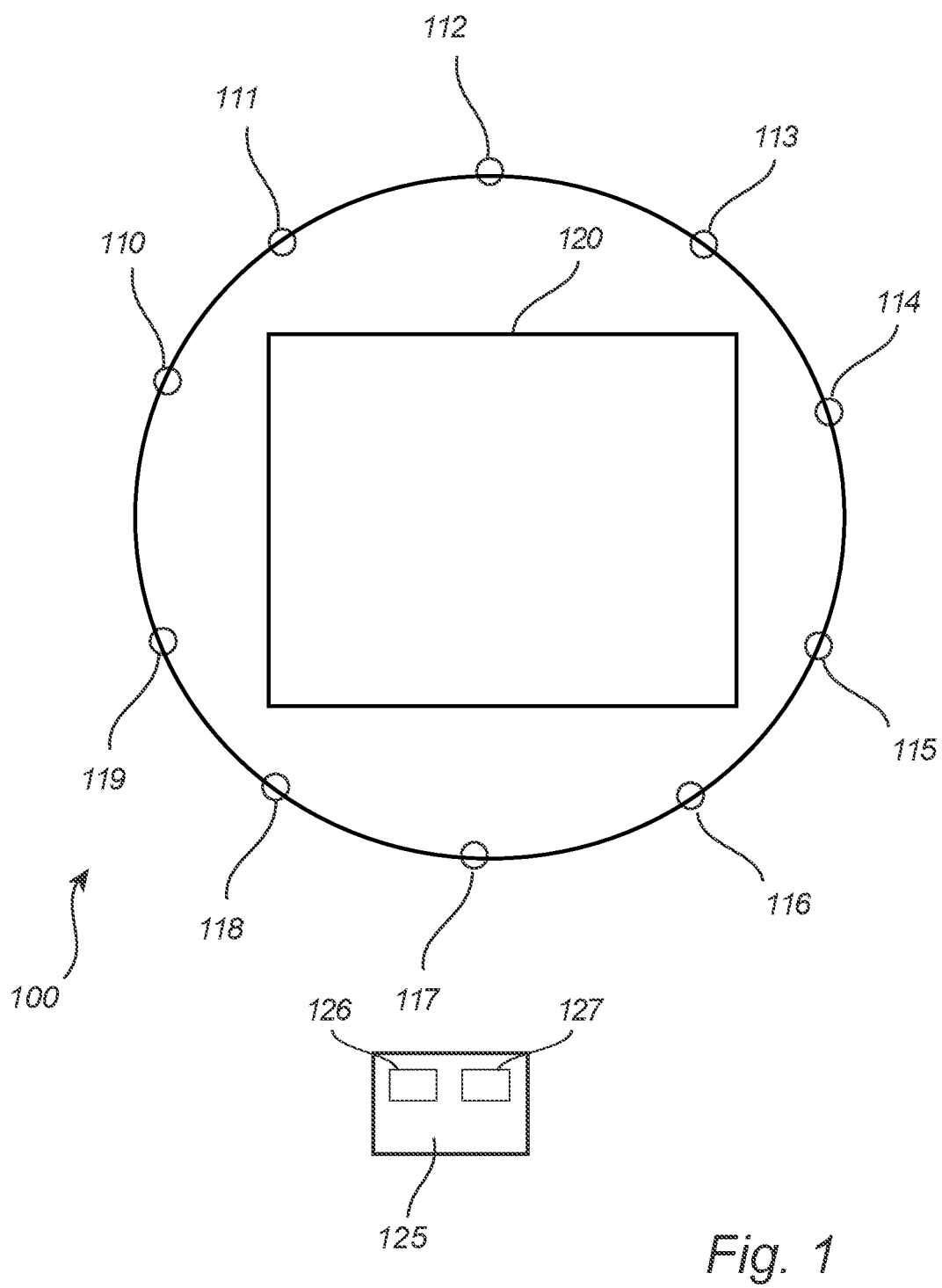
FIG. 1 shows a schematic view of an eye tacking system, in which embodiments may be implemented.

FIG. 1 shows a simplified view of an eye tacking system 100 (which may also be referred to as a gaze tracking system) in a head mounted device in the form of a virtual reality (VR) device or VR glasses. The system 100 comprises illuminators 110-119 for illuminating the eyes of a user, and a light sensor 120 for capturing images of the eyes of the user. The illuminators 110-119 may for example be light emitting diodes emitting light in the infrared frequency band, or in the near infrared frequency band. The light sensor 120 may for example be an image sensor of any type, such as a complementary metal oxide semiconductor (CMOS) image sensor or a charged coupled device (CCD) image sensor. The image sensor may consist of an integrated circuit containing an array of pixel sensors, each pixel containing a photodetector and an active amplifier. The image sensor is capable of converting light into digital signals. In reality, as an example, it could be Infrared image sensor or IR image sensor RGB sensor RGBW sensor RGB or RGBW sensor with IR filter The eye tracking system 100 also comprises circuitry 125, for example including a receiver 126 and processing circuitry 127, for receiving and processing the images captured by the light sensor 120. The circuitry 125 may for example be connected to the light sensor 120 and the illuminators 110-119 via a wired or a wireless connection and be co-located with the light sensor 120 and the illuminators 110-119 or located at a distance, e.g. in a different device. In another example, the circuitry 125 may be provided in one or more stacked layers below the light sensitive surface of the light sensor 120.

It is to be noted that the location of the image sensor 120 in FIG. 1 is only for illustrative purposes. The location of the sensor for one eye in a VR device is generally away from the line of sight for the user in order not to obscure a VR display arranged in the VR device for that eye. This is e.g. enabled by means of so called hot mirrors which reflects a portion of the light and the rest of the light to pass, e.g. infrared light is reflected and visible light is allowed to pass.

In the eye tracking system described with reference to FIG. 1, the illuminators 110-119 are arranged in an eye tracking module along the periphery of a circle. This arrangement serves only as an example. It will be appreciated that more or less any number of illuminators and light sensors may be employed for eye tracking, and that such illuminators and light sensors may be distributed in different ways.

Figure 2:
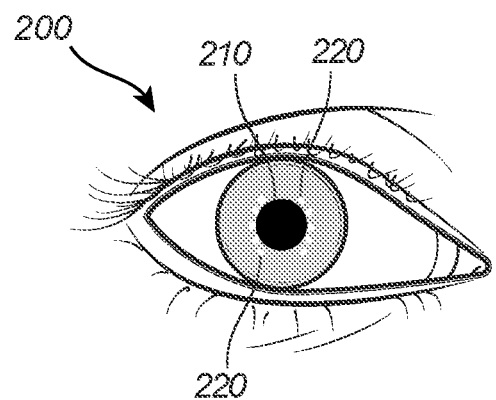
FIG. 2 shows an example image of an eye.

FIG. 2 shows a simplified example of an image of an eye 200, captured by the light sensor 120 of FIG. 1. The circuitry 125 may for example employ image processing (such as digital image processing) for extracting features in the image. The circuitry 125 may for example employ pupil center cornea reflection (PCCR) eye tracking to determine where the eye 200 is looking. In PCCR eye tracking, the position of the center of the pupil 210 and the position of the center of glints 220 at the eye 200 are estimated in the circuitry 125. The glints 220 are caused by reflection of light from the plurality of illuminators 110-119. The circuitry 125 calculates where the user's eye is in space using the glints 220 and where the user's eye 200 is pointing using the pupil 210. Since there is typically an offset between the optical center of the eye 200 and the fovea, the circuitry 125 performs calibration of the fovea offset to be able to determine where the user is looking. The gaze directions obtained from the left eye and from the right eye may then be combined to form a combined estimated gaze direction (or viewing direction).

Figure 3A:
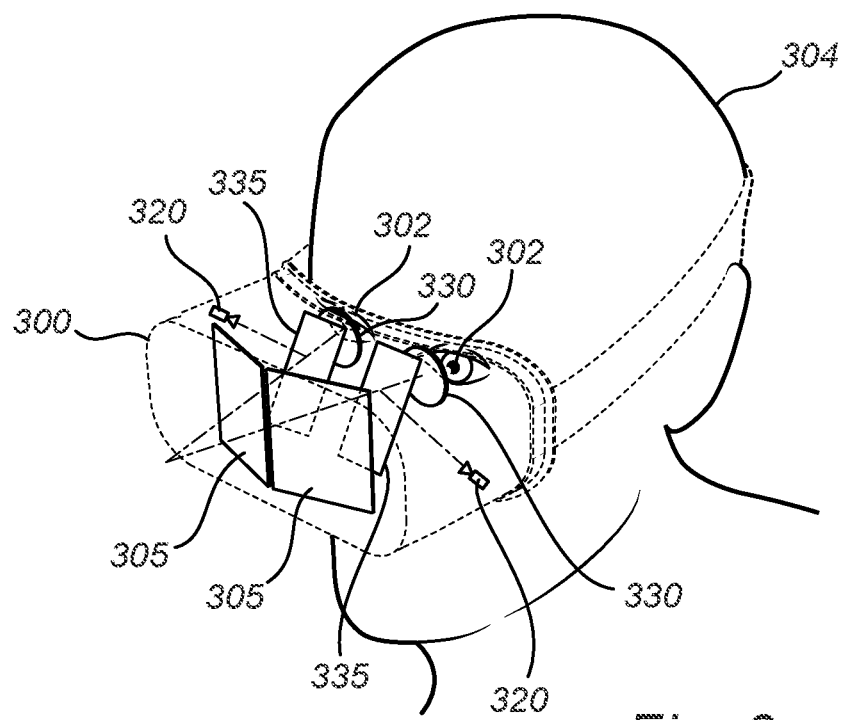
FIG. 3a shows a view of selected parts of a head mounted device.
Figure 3B:
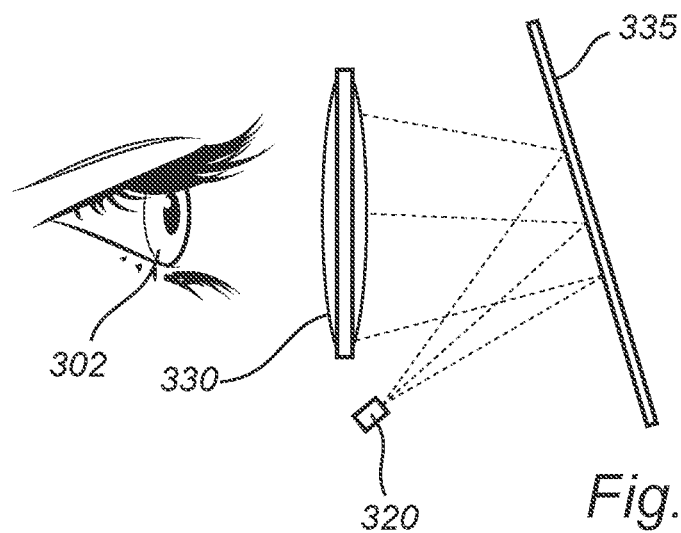
FIG. 3b shows a side view of selected parts of a head mounted device.
Figure 3C:
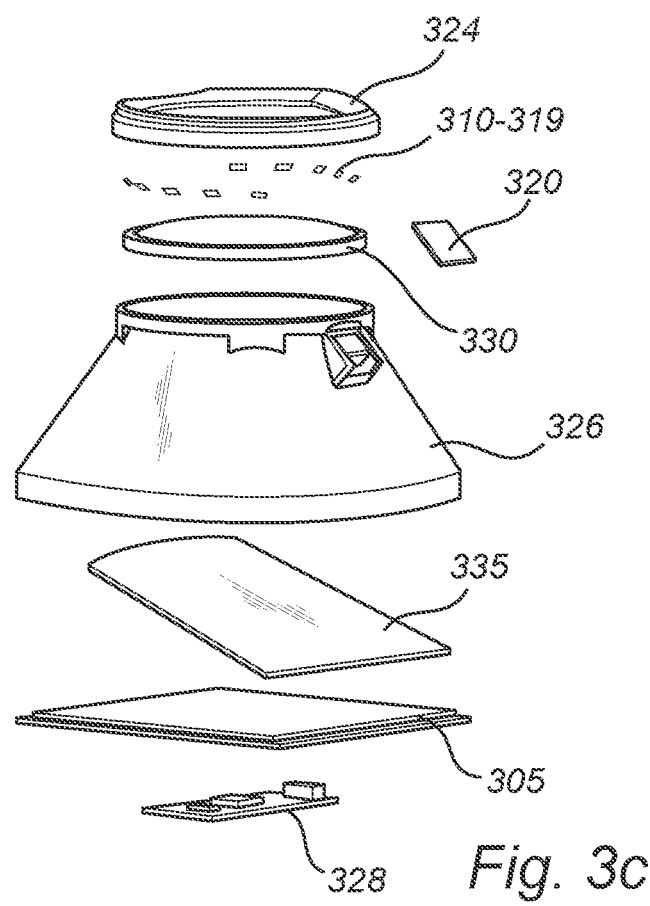
FIG. 3c shows a simplified n exploded view of selected parts of a head mounted device.

FIGS. 3a-c each show a separate view of selected parts of a head mounted device in the form of a virtual reality (VR) device (VR glasses) 300 including an eye tracking system in which embodiments may be implemented.

FIG. 3a shows a view of selected parts of a head mounted device in the form of the VR glasses 300 including an eye tracking system in which embodiments may be implemented. In addition to the VR glasses 300, eyes 302 and a head 304 of a user are shown. The VR portion of the VR glasses 300 shown comprises two VR displays 305 and two VR lenses 330, one VR display 305 and one VR lens 330 for each eye 302. The VR displays 305 are positioned in front of the eyes 302 and the VR lenses 330 are positioned between the eyes 302 and the VR displays 305. In alternative to two VR displays 305, two regions of a single VR display may be used. The eye tracking portion of the VR glasses 300 comprises two hot mirrors 335 and two cameras 320. In order to capture images of the eyes 302 for use in eye tracking, the hot mirrors 335 are arranged between the VR displays 305 and the VR lenses 330. Furthermore, illuminators (not shown) are arranged on or in the VR glasses 300 such that illumination rays are directed towards the eyes 302. Reflections from the eyes 302 of the illumination rays towards the hot mirrors 335 will reflect towards the cameras 320 in which the illumination rays are detected to produce an image of the eye. For example, the hot mirrors 335 may be of a type such that they will reflect light in the infrared frequency band but be transparent for light in the visible frequency band. The illuminators (not show) used would then produce illumination rays in the infrared frequency band and the cameras 320 will include image sensors able to detect light in the infrared frequency band.

FIG. 3b shows a side view of selected parts of the VR glasses 300. Illumination rays from the illuminators (not shown) towards the eye 302 will reflect back and pass through the VR lens 330 towards the hot mirror 335 and reflect towards the camera 320 in which the illumination rays are detected to produce an image of the eye.

FIG. 3c shows an exploded view of selected parts of the VR glasses 300. Selected parts for one eye are shown including an illuminator cover 324, illuminators in the form of light emitting diodes (LEDs) 310-319, the camera 320 including an image sensor, the VR lens 330, a lens cup or lens tube 326, the hot mirror 335, the VR display 305 and an electronics board 328. FIG. 3c shows an example arrangement of the illuminators in the form of LEDs 310-319, where the LEDs 310-319 are arranged along the periphery of the VR lens 330 to produce a pattern when illuminating the eye 302. The illumination rays from the LEDs 310-319 reflected from the eye and the hot mirror 335 is detected in the camera 320 to produce an image of the eye.

Head mounted devices, such as in VR glasses 300, can be enhanced by including wearable eye tracking using illuminators and one or more light sensors 320 arranged in the head mounted device for determining eye direction and/or gaze direction based on estimation of a position of a center of the pupil and a position of the center of one or more glints at the eye from the illuminators. A problem that can arise in such devices when a further optical arrangement that converges or diverges light, such as spectacles (glasses) worn by the user under the VR glasses 300, light from the illuminators can be reflected by a lens/glass of the spectacles together with features of the VR lens 330 onto the image sensor 320. Glints in an image of the eye used for eye tracking corresponding to such reflections may make it difficult or impossible to determine eye direction and/or gaze direction or at least not with desirable accuracy.

Arranging illuminators fixed in the VR glasses in FIGS. 3a-c, will result in the illuminators being arranged at substantially fixed positions in relation to an eye of a user when using the system as long as the VR glasses are not moved in relation to the eye of the user during use.

Figure 4:
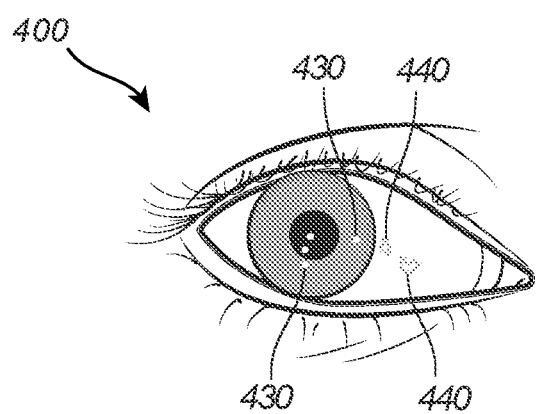
FIG. 4 shows a simplified view of an image of an eye.

FIG. 4 shows a simplified view of an image 400 of an eye of a user in relation to embodiments of which examples are disclosed in the following. The image is captured in a head mounted system such as the VR glasses disclosed in relation to FIGS. 3a-c. However, images captured in other systems which are not head mounted are similarly applicable.

The image 400 is schematic. For a more detailed image of an eye including reflections both from the cornea of the user's eye and from sclera of the user's eye, reference is made to FIG. 5.

For eye tracking, the eye of the user is illuminated by means of a plurality of illuminators. The image 400 is the result of an image sensor detecting light from the plurality of illuminators reflected from the eye of the user. The image 400 of the eye of the user is then received in a processing circuitry from the image sensor.

As is illustrated in FIG. 4, glints 430 resulting from light from the plurality of illuminators reflected from the cornea of the user's eye appear in the image 400. Furthermore, also glints 440 resulting from light from the plurality of illuminators being reflected from the sclera of the user's eye appear in the image 400.

Figure 5:
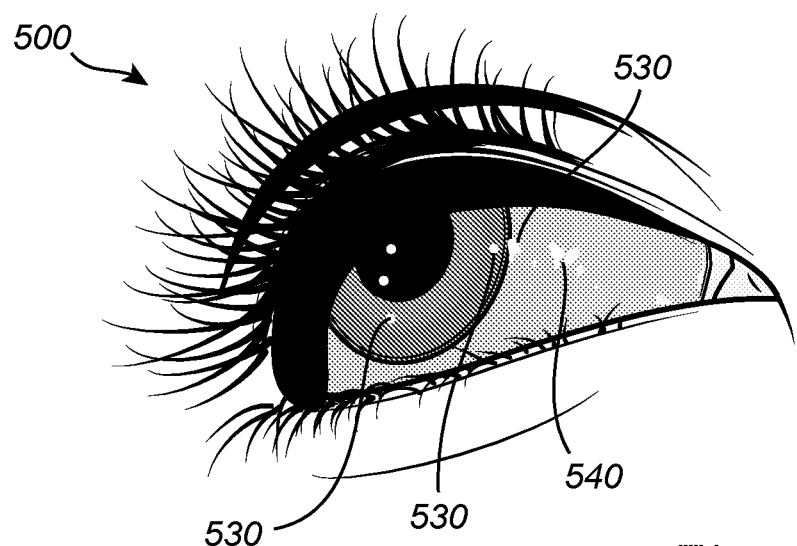
FIG. 5 shows an image of an eye.

FIG. 5 shows an image 500 of an eye of a user in relation to embodiments of which examples are disclosed in the following. The image is captured in a head mounted system such as the VR glasses disclosed in relation to FIGS. 3a-c. However, images captured in other systems which are not head mounted are similarly applicable.

The image 500 is the result of an image sensor detecting light from a plurality of illuminators reflected from the eye of the user. The image 500 of the eye of the user is then received in a processing circuitry from the image sensor.

As is illustrated in FIG. 5, glints 530 resulting from light from the plurality of illuminators reflected from the cornea of the user's eye appear in the image. Furthermore, glints 540 resulting from light from the plurality of illuminators being reflected from the sclera of the user's eye also appear in the image. Reflections from sclera will be represented as glints 540 are generally not useful for eye tracking and rather risk to be mistaken for glints 530 resulting from corneal reflections and hence risk to introduce errors. For example, in a situation where representations of reflections from sclera appear in the image in addition the representation of corneal reflections, such reflections risk to introduce errors in an eye tracking algorithm such that it will be difficult or impossible to determine eye direction and/or gaze direction or at least not with desirable accuracy. Identifying a glint 540 that is a representation of a reflection from sclera reduces the risk of introduction of errors in the eye tracking system by mistakenly identifying such glints as representations of corneal reflections.

In general, the pixel intensity of a representation in an image of the sclera is higher than the pixel intensity of a representation in the image of the iris and a representation in the image the pupil, respectively. Hence, the difference between the pixel intensity of a glint in the image and the pixel intensity of neighboring pixel to the glint will be less for a glint 540 resulting from a reflection in the sclera and located in the representation of the sclera in the image than for a glint 530 resulting from a reflection in the cornea and located in a representation of the iris or in a representation of the pupil, respectively in the image 500. The pupil and the iris generally coincide with the portion of the surface of the cornea which can be approximated with a portion of a surface of a sphere. Hence, a threshold can be set for the intensity difference between the pixels of a glint and the neighboring pixels such that all, or an acceptable portion of, the glints 540 resulting from a reflection from the sclera are identified, while limiting the risk that glints 530 resulting from a reflection from the approximately spherical portion of the cornea are identified as glints 540 resulting from a scleral reflection.

Neighboring pixel can for example be defined as a set of pixels in the predetermined vicinity area with respect to the glint. In a non-limiting example, the predetermined vicinity area may be a circular region with a predetermined radius with respect to the (MASS) center of the glint. However, the predetermined vicinity area can be any shape.

Figure 6:
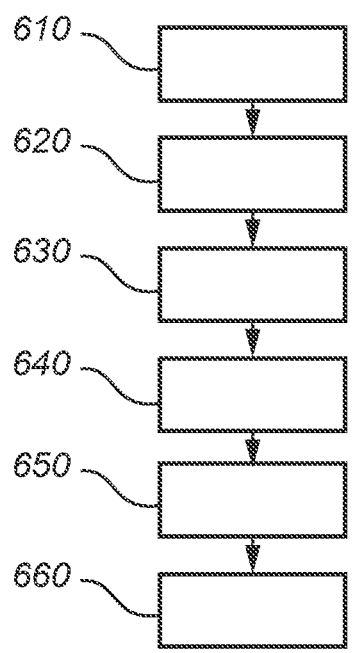
FIG. 6 is a flow chart of an example of a method of identifying scleral reflections in an eye tracking system.

FIG. 6 shows an example of a method of identifying scleral reflections in an eye tracking system. The method comprises receiving 610 an image of an eye of a user from an image sensor. The image is a result of the image sensor detecting light from one or more illuminators reflected from the eye of the user. The method further comprises identifying 620 a glint in the image. A glint is a representation in the image of a reflection of light from a cornea of the eye of the user or from a sclera of the eye of the user. The method further comprises determining 630 a first pixel intensity of the glint, determining 640 a second pixel intensity of neighbor pixels of the glint, and determining 650 an absolute value of the difference between the first pixel intensity of the glint and the second pixel intensity of the neighbor pixels of the glint. On condition that the determined absolute value of the difference is below a predetermine threshold value, the glint is identified 660 as a representation of a reflection from the sclera of the eye of the user.

The first pixel intensity may be the mean pixel intensity of the pixels constituting the glint. The second intensity may be the mean pixel intensity of the neighboring pixels. The neighboring pixels may be defined as . . . .

The method may further comprise identifying the glint as a corneal reflection on condition that the determined absolute value of the difference is above the predetermine threshold value.

A person skilled in the art realizes that the present invention is by no means limited to the preferred embodiments described above. On the contrary, many modifications and variations are possible within the scope of the appended claims. For example, the person skilled in the art realizes that the methods described herein may be performed by other eye/gaze tracking systems than the example eye/gaze tracking system 100 shown in FIG. 1, for example any eye/gaze tracking system in which the location of illuminators is fixed in relation to the eyes of a user when the system is used and in eye/gaze tracking systems in which the location of illuminators is not fixed in relation to the eyes of the user when the system is used.

Furthermore, the descriptions have been made in relation to one eye. However, a person skilled in the art realizes that the methods and systems may be performed for two eyes also.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems. The mere fact that certain measures/features are recited in mutually different dependent claims does not indicate that a combination of these measures/features cannot be used to advantage. Method steps need not necessarily be performed in the order in which they appear in the claims or in the embodiments described herein, unless it is explicitly described that a certain order is required. Any reference signs in the claims should not be construed as limiting the scope.

The invention claimed is:

1. A method of differentiating corneal reflections from scleral reflections in an eye tracking system, the method comprising:
   receiving an image of an eye of a user from an image sensor, the image resulting from the image sensor detecting light from one or more illuminators reflected from the eye of the user;
   identifying a glint in the image, wherein the glint is a representation in the image of a reflection of light from a cornea of the eye of the user or from a sclera of the eye of the user;
   determining a first pixel intensity of the glint;
   identifying a set of neighbour pixels of the glint from a predetermined vicinity area of the glint, wherein the neighbour pixels do not contain part of the glint;
   determining a second pixel intensity of the neighbour pixels of the glint;
   determining an absolute value of the difference between the first pixel intensity of the glint and the second pixel intensity of the neighbour pixels of the glint; and
   on condition that the determined absolute value of the difference is above a predetermined threshold value, identifying the glint as a representation of a reflection from the cornea of the eye of the user.

2. The method of claim 1, further comprising:
   on condition that the predetermined absolute value of the difference is below the predetermined threshold value, identifying the glint as a scleral reflection.

3. An eye tracking system comprising:
   a receiver, the receiver configured to receive an image, the image resulting from an image sensor detecting light from one or more illuminators reflected from the eye of a user; and
   a processor, the processor configured to:
      identify a glint in the image, wherein the glint is a representation in the image of a reflection of light from a cornea of the eye of the user or from a sclera of the eye of the user;
      determine a first pixel intensity of the glint;
      identify a set of neighbour pixels of the glint from a predetermined vicinity area of the glint;
      determine a second pixel intensity of the neighbour pixels of the glint;
      determine an absolute value of the difference between the first pixel intensity of the glint and the second pixel intensity of the neighbour pixels of the glint; and
      on condition that the determined absolute value of the difference is above a predetermined threshold value, identifying the glint as a representation of a reflection from the cornea of the eye of the user.

4. The eye tracking system of claim 3, wherein the processor is further configured to:
   on condition that the determined absolute value of the difference is below the predetermined threshold value, identifying the glint as a scleral reflection.

5. The eye tracking system of claim 3, wherein the receiver is adapted to be mounted in a head mounted device.

6. The eye tracking system of claim 5, wherein the head mounted device is a virtual reality device.

7. One or more non-transitory computer-readable storage media storing computer-executable instructions that, when executed by an eye tracking system, cause the eye tracking system to:

receive an image of an eye of a user from an image sensor, the image resulting from the image sensor detecting light from one or more illuminators reflected from the eye of the suer;

identify a glint in the image, wherein the glint is a representation in the image of a reflection of light from a cornea of the eye of the user or from a sclera of the eye of the user;

determine a first pixel intensity of the glint;

identify a set of neighbour pixels of the glint from a predetermined vicinity area of the glint, wherein the neighbour pixels do not contain part of the glint;

determine a second pixel intensity of the neighbour pixels of the glint;

determine an absolute value of the difference between the first pixel intensity of the glint and the second pixel intensity of the neighbour pixels of the glint; and on condition that the determined absolute value of the difference is above a predetermined threshold value, identifying the glint as a representation of a reflection from the cornea of the eye of the user.

8. The one or more non-transitory computer-readable storage media of claim 7, wherein the computer-executable instructions, when executed by the eye tracking system, further cause the eye tracking system to:

on condition that the determined absolute value of the difference is below the predetermined threshold value, identifying the glint as a scleral reflection.

\* \* \* \* \*